United States Patent [19]

Feggeler

[11] Patent Number: 4,748,639
[45] Date of Patent: May 31, 1988

[54] REVERSIBLE ENERGY SPREADING DATA TRANSMISSION TECHNIQUE

[75] Inventor: John C. Feggeler, Holmdel, N.J.

[73] Assignee: American Telephone and Telegraph Company, AT&T Bell Laboratories, Murray Hill, N.J.

[21] Appl. No.: 727,110

[22] Filed: Apr. 25, 1985

[51] Int. Cl.[4] .................. H04B 1/62; H04B 15/00
[52] U.S. Cl. ................... 375/58; 333/28 R; 381/34; 375/1
[58] Field of Search ............ 343/17.2 R, 17.2 PC; 178/22.01, 22.04; 375/1, 18, 40, 58, 60; 455/63, 65; 371/39, 44; 333/20, 28 R, 18; 370/109, 108; 381/34; 342/132; 380/9, 42

[56] References Cited

U.S. PATENT DOCUMENTS

| | | | |
|---|---|---|---|
| 2,678,997 | 5/1954 | Darlington | 375/58 |
| 2,705,795 | 4/1955 | Fisk et al. | 370/50 |
| 2,982,852 | 5/1961 | Fano | 375/58 |
| 3,213,452 | 10/1965 | Carpentier et al. | 343/17.2 PC |
| 3,423,729 | 1/1969 | Heller | 375/58 |
| 3,427,617 | 2/1969 | Richman | 343/17.2 R |
| 3,484,693 | 12/1969 | Fong | 375/1 |
| 3,512,160 | 5/1970 | Meeker | 370/18 |
| 3,524,136 | 8/1970 | Albersheim | 375/58 |
| 3,809,923 | 5/1974 | Esser | 307/221 D |
| 3,985,968 | 10/1976 | Steizenmuller | 370/18 |
| 4,211,485 | 7/1980 | Koreicho | 343/17.2 PC |
| 4,285,045 | 8/1981 | Tamori et al. | 364/724 |
| 4,621,368 | 11/1986 | Onoe et al. | 375/40 |
| 4,672,633 | 6/1987 | Claasen et al. | 375/60 |

OTHER PUBLICATIONS

"The Theory and Design of Chirp Radars", *The Bell System Technical Journal*, J. R. Klauder et al., Jul. 1960, pp. 745–808.

"H.F. Data Transmission Using Chirp Signals", *Proceedings of the Inst. of Electrical Engineers*, G. F. Gott et al., Sep. 1971, pp. 1162–1166.

"Digital Chirp Modulation: Opportunities for Lower Cost and Higher Performance in Mobile Satellite Communications", *Proc. of the AIAA Inst. of Electronics and Comm. Engineers AIAA 8th Comm. Satellite Systems Conf.*, P. K. Lee et al., 1980, pp. 696–702.

*Primary Examiner*—Benedict V. Safourek
*Attorney, Agent, or Firm*—Jack S. Cubert

[57] ABSTRACT

In a data transmission system including a transmission medium that is subject to fast fades of duration longer than individual data symbols to be transmitted, a chirp filter is provided for time-spread processing the data signals prior to transmission. The processing spreads the energy of each symbol over an interval longer than the length of expected individual fades. In a receiving terminal inverse processing is provided to remove the chirp effect.

4 Claims, 2 Drawing Sheets

REVERSIBLE ENERGY SPREADING DATA TRANSMISSION TECHNIQUE

FIELD OF THE INVENTION

This invention relates to data transmission systems, and it relates in particular to such systems which are suitable for fast Rayleigh fading environments.

BACKGROUND OF THE INVENTION

Data transmission at high speeds is difficult to accomplish at practical cost in a transmission medium that is subject to fast fading such as is found in cellular mobile radiotelephone systems. For example, in a system operating in the range of 850 megahertz, individual fades to 10 dB below the local mean power level in the vicinity of the receiver occur on the average at about thirty fades per second at a vehicle speed of about 35 MPH. In such an environment, information signal bits (data or digital voice) are typically of much shorter duration than the duration of a typical fade. A very poor error rate results. Errors result because information in the detected signal is either lost for the fade duration or it is accompanied by bursts of impairments which affect the ability of the receiver to identify properly the detected signal. Typical solutions have included approaches such as sending at a sufficiently low bit rate, e.g., tens of bits/second, to reduce the impact on error rate or such as sending multiple repetitions of every bit. Either solution greatly limits the effective bit rate of useful throughput of data, including digitized speech.

Chirp processing, or modulation, has been used for various purposes over the years at least since its use in radar systems as taught by J. R. Klauder et al. in "The Theory and Design of Chirp Radars" in *The Bell System Technical Journal,* Vol. 39, No. 4, pages 745–808, July 1960. In a number of applications of chirp processing, the bandwidth of energy in a pulse is expanded and time dispersed within the pulse; and the expanded bandwidth pulses are separately transmitted. Regulatory constraints prevent such bandwidth expansion in cellular radiotelephone systems.

Application of chirp to data transmission by using chirp to increase pulse bandwidth and then time compressing the chirped pulse was proposed by G. F. Gott in "H.F. Data Transmission Using Chirp Signals," Vol. 118, No. 9, pages 1162–1166 September 1971. As noted above, regulatory constraints make bandwidth expansion an unacceptable alternative for many applications.

A P. K. Lee et al. paper "Digital Chirp Modulation: Opportunities For Lower Cost And Higher Performance In Mobile-Satellite Communications," in *Proceedings of the AIAA Institute of Electronics and Communications Engineers AIAA* 8th Communications Satellite Systems Conference, 1980 at pages 696–702 shows bandwidth expansion employed for the relatively slow fading of a satellite system employing surface acoustic wave chirp filters to achieve large time-bandwidth products.

A K. Fong U.S. Pat. No. 3,484,6g3 shows a frequency shifted, sliding tone, sampled data system for satellite communication in which an improved signal-to-noise ratio is realized by increasing the bandwidth occupancy of the signal. Chirp signals, which are time spaced in their respective channels, span only one pre-chirp input pulse interval. As between the channels, the signals overlap in time by half an input pulse interval and are separately shifted in frequency in different ways by amounts determined by input baseband sample amplitudes. The chirp signals so modulated are then combined into a single channel.

SUMMARY OF THE INVENTION

The foregoing difficulties of high speed data transmission in a fading medium are resolved by time processing signals to modify the distribution of components of each data bit signal in at least one direction between a data-bit size interval and a larger interval. In a communication system, the energy of each data bit is spread over an interval longer than the duration of a typical anticipated fast fade in accordance with a predetermined algorithm, such as a form of chirp modulation, prior to application to the transmission medium. At a receiving terminal, an inverse algorithm is applied to remove the chirp modulation effect.

BRIEF DESCRIPTION OF THE DRAWING

A more complete understanding of the invention and its various features, objects, and advantages may be obtained from a consideration of the following Detailed Description in connection with the appended claims and the attached Drawing in which:

DETAILED DESCRIPTION

Figure 1:
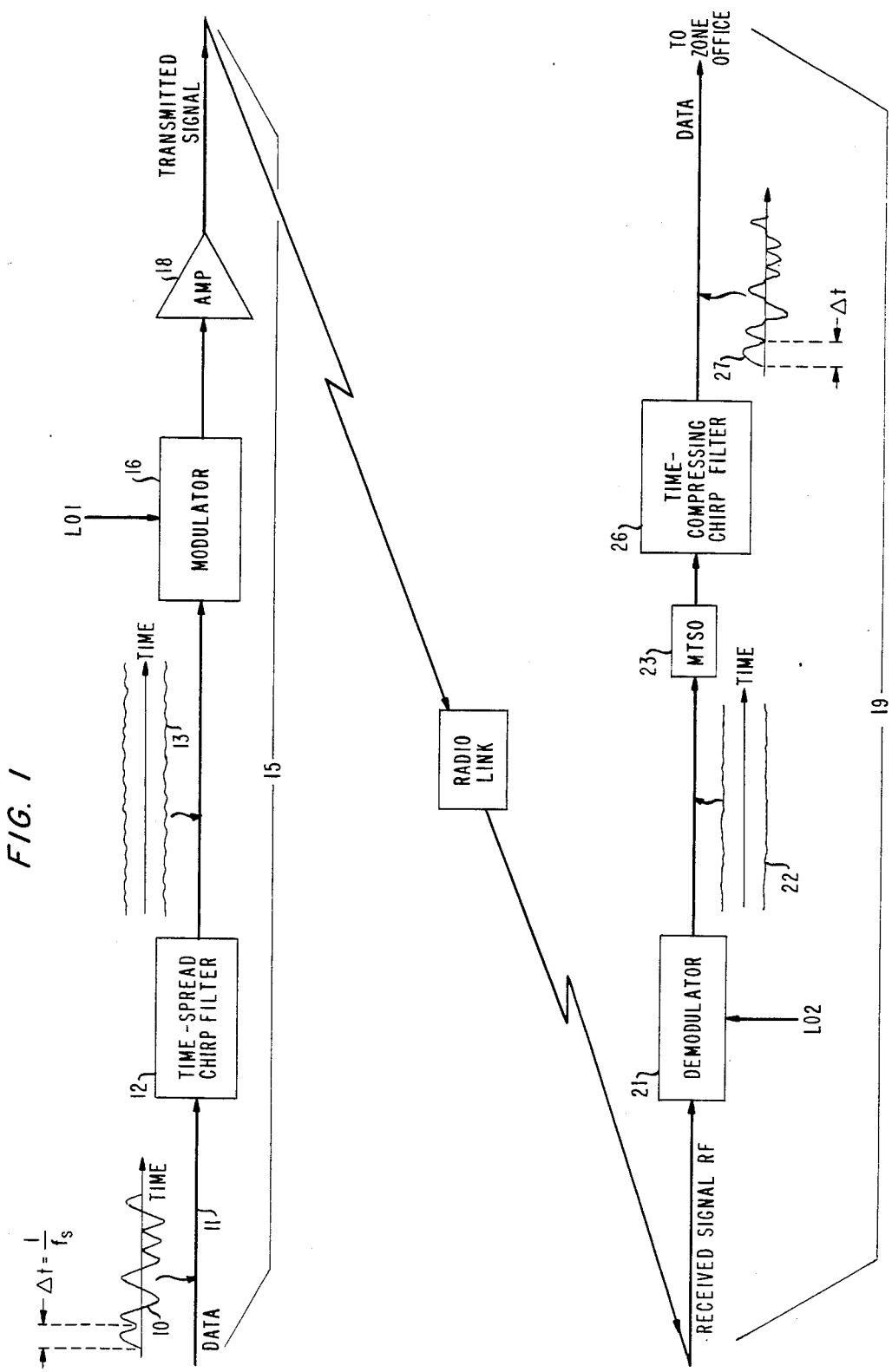
FIG. 1 is a simplified functional diagram of a telecommunication signal path for data and utilizing the invention.

In FIG. 1, the time processing of data bit signals to modify the distribution of components is illustrated in the form of filters for modifying the phase distribution of frequency components of each data bit signal. For this purpose, time-interval-processing, constant bandwidth, chirp filtering is applied illustratively to one direction of a cellular radiotelephone system transmission path for user data. The term "user data" refers to relatively continuous data, including digitized speech, transmission between calling and called parties in the illustrative system. At least one of the parties is in a mobile station 15 coupled through a radio link to fixed station 19. User data is to be distinguished from control data which is often transmitted in a bursty manner between a mobile station and a fixed station for signaling and supervisory functions. However, the invention is, of course, applicable to the transmission of control data as well. One example of a cellular radiotelephone system is developed in, e.g., a collection of papers comprising the January 1979 issue of *The Bell System Technical Journal.* In the drawing, details of known aspects of such a system transmission path not required for an understanding of the invention are omitted.

Figure 2:
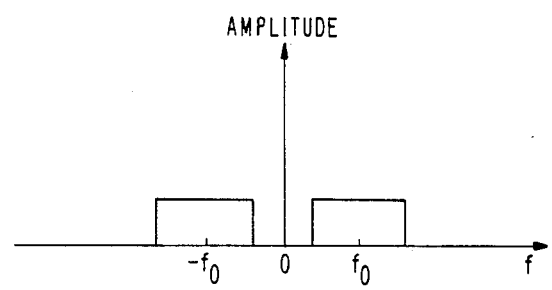
FIGS. 2–5 are signal diagrams provided to facilitate an understanding of the invention.

A source (not shown) of data signals is, for example, a computer terminal in a motor vehicle and arranged for processing either vehicle-user input or vehicular telemetry inputs or received signals for either the vehicle or the user. Outgoing data from the source is a sequence of bits which have, illustratively for binary transmission, a data bit interval duration of $\Delta t$ corresponding to a bit or sample rate $f_s$ such as 2400 bits per second. A typical time domain segment 10 of such a baseband data signal is illustrated in FIG. 1 adjacent to an input lead 11 of a time-spread, constant bandwidth, chirp filter 12. A one-bit, or one-sample, interval $\Delta t$ of the segment is also shown enlarged in FIG. 3. The chirp filter is a means for predistorting, i.e., variously called linearly frequency modulating or time spreading or chirping or phase shift processing, the different frequency components of a data bit interval, or pulse, over a predetermined time interval T which is longer than the original duration of the bit interval and in accordance with a predetermined phase-frequency pattern. FIGS. 2–5 illustrate amplitude-versus-frequency and amplitude-versus-time characteristics for inputs (FIGS. 2 and 3) to, and chirped outputs (FIGS. 4 and 5) from, filter 12. The frequency characteristics of FIGS. 2 and 4 also include superimposed phase characteristics. The constant bandwidth aspect is illustrated in FIGS. 2 and 4 where it can be seen that the spectral bandwidth W of a received input data pulse (FIG. 2) on lead 11 is the same as the spectral bandwidth W of the corresponding chirped output pulse (FIG. 4) from filter 12. Dashed lines in FIG. 4 show that, with respect to the phase of a frequency component $f_0$ at the center of the band W, the other components have different phases which increase in magnitude toward either end of the band W.

Figure 3:
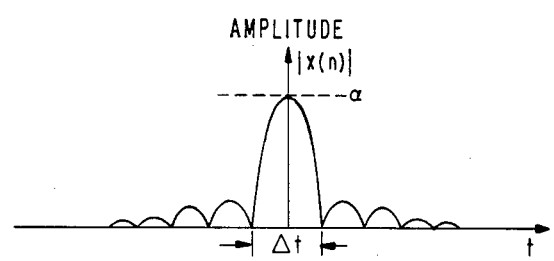
Figure 4:
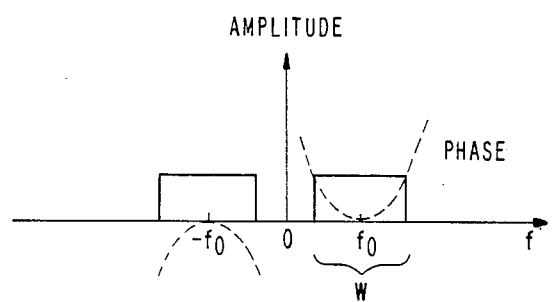
Figure 5:
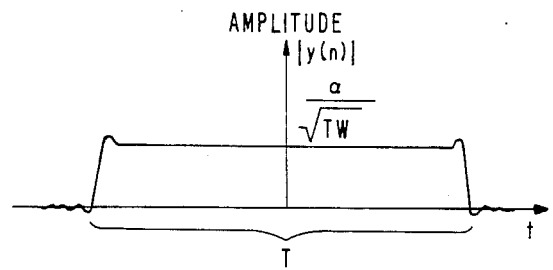

FIG. 3 illustrates an individual input pulse of the data bit signals received on lead 11 at an arbitrary time $n\Delta t$ and having a magnitude $|x(n)| = \alpha$ at the center of the pulse. Pulse sidelobes can be ignored for signal processing purposes because each has zeroes or negligible values at times corresponding to the sampling times of adjacent bits. The central, or main, lobe of the FIG. 3 pulse has a time-bandwidth product determined by $\Delta t$ and W which is approximately unity. In FIG. 5, the chirped version of the FIG. 3 pulse has its frequency components time spread, as indicated by the phase characteristic in FIG. 4, so that the energy of the FIG. 3 pulse is spread over a time interval T with an essentially constant magnitude $|y(n)|$ equal to the ratio of $\alpha$ to the square root of the new time-bandwidth product TW. The FIG. 5 time scale is distorted for convenience of illustration because, in fact, $T >> \Delta t$ so that, for the illustrated cellular radiotelephone embodiment, T spans 100 or more $\Delta t$ intervals. In such a cellular system, the bandwidth is limited by regulatory considerations so it is advantageous to utilize a large time spread which spans the duration of at least a typical individual fade of the cellular system fast-fading environment.

The analog transfer function of a transmitter terminal chirp filter for a linear frequency dispersion charcteristic (first derivative of the nonlinear phase characteristic illustrated in FIG. 4) is as taught in the aforementioned Klauder et al. paper. A corresponding discrete time transfer function is typically represented for N an even integer, by the expression $H_T(m)$, $m = 1, \ldots, N$ where $H_T(m)$ is given by $$H_T(m) = \begin{cases} 0, & m = 1 \text{ and } |f_m - f_0| < \frac{W}{2} \\ e^{j\frac{\pi}{k}(f_m - f_0)^2} & m = 2, \ldots, \frac{N}{2} \text{ and} \\ & |f_m - f_0| < \frac{W}{2} \\ 0 & m = \frac{N}{2} + 1 \text{ and } |f_m - f_0| < \frac{W}{2} \\ H_T^*(N + 2 - m), & m = \frac{N}{2} + 2, \ldots, N, \text{ and} \\ & |f_m - f_0| < \frac{W}{2} \\ 0 & \text{elsewhere} \end{cases}$$

For N an odd integer, the discrete time transfer function becomes $$H_T(m) = \begin{cases} 0 & m = 1 \text{ and } |f_m - f_0| < \frac{W}{2} \\ e^{j\frac{\pi}{k}(f_m - f_0)^2} & m = 2, \ldots, \frac{N+1}{2}, \\ & \text{and } |f_m - f_0| < \frac{W}{2} \\ H_T^*(N + 2 - m), & m = \frac{N+3}{2}, \ldots, N \text{ and} \\ & |f_m - f_0| < \frac{W}{2} \\ 0 & \text{elsewhere} \end{cases}$$

The discrete time expressions, as applied to the illustrative embodiment of FIG. 1, use the following definitions of the terms [with illustrative values]:

$f_0$ = center frequency of the band W of interest [1650 Hz]

$\Delta t$ = 1(sample rate $f_s$) [original pulse, or bit, length —416.7 microseconds for a signal at 2400 bits per second]

$\Delta f = 1/(N\Delta t)$ the frequency differential between points on the spectrum of the filter 12 impulse response where N = number of points [256] on the impulse response used to represent a chirped pulse $f_m = m\Delta f$ is the frequency of an arbitrary point m on the spectrum of the impulse response $k = W/T$ where W = both the bandwidth of the input signal at lead 11 and the bandwidth of the chirped version thereof at the output of filter 12 [2400 Hertz]; T = dispersed (chirp) pulse length [50 milliseconds]—chosen to be long compared to a typical expected individual fade duration and therefore, long compared to $\Delta t$. [k = 48000 and TW = 120].

It will be appreciated from the foregoing that, since $T >> \Delta t$ and the data bits must leave the filter 12 at the same rate that they are applied thereto, each time-spread bit overlaps many, e.g., about 120 in the above example, nearby bits in the bit stream. The term T is then the means for fixing the extent, in the time dimension, of energy dispersion for each data bit interval $\Delta t$. Similarly, the term W, employed as above defined in the transfer function, is the means for fixing the bandwidth of the filter processing to be essentially the same as the bandwidth of the input signals to the filter. The time spread result has the appearance of a rather uniformly rippled, positive-and-negative level signal set 13 at the output of the filter 12 as shown in FIG. 1. Individual data bits are not perceptible in the envelope of the signal set 13.

Transmitting station filter 12 can be implemented in various ways known in the art. One way is to employ digital filtering techniques using digital signal processors of the type taught, for example, in *The Bell System Technical Journal,* September 1981, Vol. 60, No. 7, Part 2. Another such digital signal processor is the TMS320 manufactured by the Texas Instruments Company. Another way often used is to employ surface acoustic wave devices.

In FIG. 1, signal 13 output from filter 12 is applied to a modulator 16 to be brought up to a desired radio frequency with the cooperation of the output from a local oscillator LO1. Output of that oscillator is coupled through an amplifier 18 to an output circuit 19 extending to an antenna (not shown).

In a receiving station 19 (here illustratively assumed to be a fixed station such as a cell antenna site in a cellular radiotelephone system), the modulated and chirped signal received by way of a radio link is demodulated to baseband by operation of a demodulator 21 and local oscillator LO2 to a time-spread signal 22 much like the signal 13 but now including such further distortion and fast fading effects (not shown) as may have been injected during transmission. The signal 22 is then transmitted on a wire voice trunk to a mobile telecommunications switching office (MTSO) 23 and from there to a receiving station chirp filter 26. This filter is a time-compressing, constant-bandwidth filter which has a transfer characteristic which is the complex conjugate of that of the transmitting station filter 12, i.e., $H_R(m)=H_T^*(m)$ $m=1,2,\ldots N$. Filter 26 accomplishes the phase shift equalization needed to restore the time-bandwidth product of the data bit signals to approximately unity. Furthermore, the inverse process, i.e., equalization, employed in the receiver will convert short duration, high amplitude impairments such as FM "clicks" or "impulse" noise into much lower amplitude and long time-duration impairments thereby reducing the likelihood of destruction of individual data bits or symbols by these impairments. The need for a large T is especially apparent since the impairment magnitude reduction needed is determined by the inverted square root function of the time-bandwidth product TW as indicated in FIG. 5. Output of filter 26 is applied to a circuit extending through a telephone system zone office to a fixed station party to the communication or through a junctor (not shown) back into the MTSO to another mobile station in the radiotelephone system.

Filter 26 is usually implemented in the same technology as the filter 12 and is used to time compress the chirped signal 22 to reproduce the received version 27 of original pulses such as those of the signal time domain segment 10. Since the chirp function is a filtering operation, no synchronization beyond the usual bit timing is required between transmitting and receiving station filters 12 and 26.

Although the invention has been described in connection with a particular embodiment thereof, it is to be understood that additional embodiments, applications, and modifications thereof which will be apparent to those skilled in the art are included within the spirit and scope of the invention.

What is claimed is:

1. A method for processing input data bit signals each of a predetermined duration in a single channel for transmission in a fading medium in which fades exceed the duration of an input data bit, said method comprising the steps of receiving input data bits at a predetermined rate, each occurring in a duration interval $\Delta t$ and having a time bandwidth product substantially equal to unity, spreading the energy of each bit interval of said channel to produce a time-spread data bit signal of duration $T >> \Delta t$ which overlaps a plurality of bit interval times of the same channel before and after said each interval, duration T being longer than said fade and having a time bandwidth product substantially greater than unity, and essentially a constant magnitude inversely proportional to the square root of the substantially greater than unity time bandwidth product, transmitting said time-spread data bit signals into said medium at said predetermined rate, receiving said time-spread data signals from said medium at said predetermined rate, and recombining the spread energy of each time-spread data bit signal received from said medium into a data bit time interval.

2. A method for processing data bit signals occurring at a predetermined rate for transmission in a fast fading medium in which fade s are longer than a data bit time interval and the method comprising the steps of predistorting said data bit signals before application to said meidum to transform said data bit signals into signals having a time-bandwidth product substantially greater than unity and essentially a constant magnitude inversely proportional to the square root of the substantially greater than unity time bandwidth product at said predetermined rate, applying said transformed signals to said medium, receiving said transformed signals from said medium, and equalizing the transformed signals received from said medium to remove at least a predetermined portion of said predistortion.

3. The method in accordance with claim 2 in which said predistorting step includes a step of filtering said data bit signals to accomplish phase-shift dispersal of frequency components thereof, and said equalizing step includes a step of filtering said received transformed signals to accomplish equalization thereof to render the time-bandwidth product thereof essentially unity.

4. A chirp filter for input signals comprising a sequence of signal samples in a predetermined bandwidth W, said signals to be transmitted in a medium subject to fading, said filter having a transfer function for N an even integer $$H_T(m) = \begin{cases} 0, & m = 1 \text{ and } |f_m - f_o| < \frac{W}{2} \\ e^{j\frac{\pi}{k}(f_m - f_o)^2} & m = 2, \ldots, \frac{N}{2} \text{ and } |f_m - f_o| < \frac{W}{2} \\ 0 & m = \frac{N}{2} + 1 \text{ and } |f_m - f_o| < \frac{W}{2} \\ H_T^*(N + 2 - m), & m = \frac{N}{2} + 2, \ldots, N, \text{ and } |f_m - f_o| < \frac{W}{2} \\ 0 \text{ elsewhere} \end{cases}$$

and for N an odd integer $$H_T(m) = \begin{cases} 0 & m = 1 \text{ and } |f_m - f_o| < \frac{W}{2} \\ e^{j\frac{\pi}{k}(f_m - f_o)^2} & m = 2, \ldots, \frac{N+1}{2}, \text{ and } |f_m - f_o| < \frac{W}{2} \\ H_T^*(N + 2 - m), & m = \frac{N+3}{2}, \ldots, N \text{ and } |f_m - f_o| < \frac{W}{2} \\ 0 \text{ elsewhere} \end{cases}$$

in which $f_m$ is the frequency at an arbitrary point m on the spectrum of the impulse response of said filter, $f_o$ is the center frequency of a band of interest, N is the number of points on said impulse response and is equal to the ratio of the sample rate of said input signals to the frequency differential between adjacent pairs of points on said spectrum of the impulse response, and k is the ratio of approximate time duration T of a chirped symbol to the bandwidth W of the chirped signal and in which filter there are provided means for fixing the duration T to be much larger than the inverted sample rate of the filter input signal as well as being long compared to the duration of individual expected fades.

* * * * *